United States Patent
Guo et al.

(10) Patent No.: US 8,833,547 B2
(45) Date of Patent: Sep. 16, 2014

(54) TRANSMISSION DEVICE AND TRANSMISSION METHOD FOR GLASS SUBSTRATE

(71) Applicant: Shenzhen China Star Optoelectronics Technology Co., Ltd., Guangdong (CN)

(72) Inventors: Zhenhua Guo, Shenzhen (CN); Chunhao Wu, Shenzhen (CN); Kunhsien Lin, Shenzhen (CN); Yongqiang Wang, Shenzhen (CN); Weibing Yang, Shenzhen (CN); Yunshao Jiang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 70 days.

(21) Appl. No.: 13/700,712

(22) PCT Filed: Nov. 16, 2012

(86) PCT No.: PCT/CN2012/084729
§ 371 (c)(1),
(2), (4) Date: Nov. 28, 2012

(87) PCT Pub. No.: WO2014/067179
PCT Pub. Date: May 8, 2014

(65) Prior Publication Data
US 2014/0124338 A1 May 8, 2014

(30) Foreign Application Priority Data
Nov. 2, 2012 (CN) .......................... 2012 1 0433800

(51) Int. Cl.
*B65G 21/22* (2006.01)
*B65G 21/20* (2006.01)

(52) U.S. Cl.
CPC .................................. *B65G 21/2045* (2013.01)
USPC ........................................................ 198/836.3

(58) Field of Classification Search
CPC ........... B65G 21/2045; B65G 21/2063; B65G 21/2072
USPC ...................... 198/836.1, 836.2, 836.3, 836.4
See application file for complete search history.

(56) References Cited

U.S. PATENT DOCUMENTS

| | | | | |
|---|---|---|---|---|
| 3,874,497 | A * | 4/1975 | Carlson ...................... | 198/836.3 |
| 4,161,138 | A * | 7/1979 | Marchetti ..................... | 493/117 |
| 4,541,888 | A * | 9/1985 | Marchetti ..................... | 156/468 |
| 4,542,616 | A * | 9/1985 | Ulrich et al. ................. | 53/136.4 |
| 5,322,160 | A * | 6/1994 | Markiewicz et al. ...... | 198/836.3 |
| 5,492,216 | A * | 2/1996 | McCoy et al. ............. | 198/626.5 |

(Continued)

*Primary Examiner* — Douglas Hess
(74) *Attorney, Agent, or Firm* — Andrew C. Cheng

(57) ABSTRACT

The present invention provides a transmission device and transmission method for glass substrate. The transmission device includes a transmission channel and a calibration mechanism; wherein the transmission channel for loading and transmitting, the calibration mechanism being disposed next to the transmission channel and the calibration mechanism comprising: a first positioning pillar, a second positioning pillar and a driver module; the first positioning pillar being disposed on one side of the transmission channel and the second positioning pillar being disposed on the other side of the transmission channel; the driver module driving the first positioning pillar and the second positioning pillar through the conveyor belt to move towards or away from each other so as to calibrate the position of the glass substrate by clamping or releasing the glass substrate during transmission. The present invention can solve the position deviation problem during transmitting glass substrate.

18 Claims, 4 Drawing Sheets

(56) References Cited

U.S. PATENT DOCUMENTS

| | | | |
|---|---|---|---|
| 5,515,668 A * | 5/1996 | Hunt et al. | 53/543 |
| 5,553,441 A * | 9/1996 | Ivansco et al. | 53/249 |
| 5,687,543 A * | 11/1997 | Shing-Tak Lam | 53/136.4 |
| 5,730,831 A * | 3/1998 | Jensen et al. | 156/475 |
| 6,209,707 B1 * | 4/2001 | Ronchi | 198/445 |
| 6,360,880 B1 * | 3/2002 | Ouellette | 198/836.1 |
| 6,378,695 B1 * | 4/2002 | Rinne | 198/836.3 |
| 6,523,823 B1 * | 2/2003 | Bakoledis | 271/223 |
| 6,612,785 B1 * | 9/2003 | Ouellette | 406/88 |
| 6,944,943 B2 * | 9/2005 | Cho et al. | 29/740 |
| 7,278,248 B2 * | 10/2007 | Vinh Le | 53/136.4 |
| 7,735,636 B2 * | 6/2010 | Lundberg | 198/836.1 |
| 8,376,129 B2 * | 2/2013 | Kimura et al. | 198/836.3 |
| 8,490,780 B2 * | 7/2013 | Bell et al. | 198/836.3 |
| 8,651,264 B2 * | 2/2014 | Spindler et al. | 198/446 |

\* cited by examiner

TRANSMISSION DEVICE AND TRANSMISSION METHOD FOR GLASS SUBSTRATE

BACKGROUND OF THE INVENTION

1. Field of the Invention

The present invention relates to the field of transmission equipment techniques, and in particular to a transmission device and transmission method for glass substrate.

2. The Related Arts

Glass substrate is a fundamental part of a liquid crystal display device. As widely know, the quality of the glass substrate has a direct impact on the important performance index of the liquid crystal display device, such as display quality. It is clear that ensuring the quality of the glass substrate is a necessary condition for improving the overall quality of the liquid crystal display device.

However, for the known manufacturing process, the transmission of the glass substrate is prone to deviation when placing glass substrate, which may lead to cracking of the glass substrate, thus a low yield rate of the glass substrate manufacturing,

SUMMARY OF THE INVENTION

The technical issue to be addressed by the present invention is to provide a transmission device and transmission method for glass substrate, to solve the deviation problem during transmitting glass substrate.

The present invention provides a transmission device for glass substrate, which comprises: a transmission channel and a calibration mechanism; the transmission channel being configured to load and transmit, the transmission channel comprising: a first mode transmission channel and a second mode transmission channel, disposed in connected manner and to transmit in order; the calibration mechanism being disposed at junction between the first mode transmission channel and the second mode transmission channel, the calibration mechanism comprising: a first positioning pillar, a second positioning pillar and a driver module; the first positioning pillar being disposed on one side of the transmission channel and the second positioning pillar being disposed on the other side of the transmission channel; the driver module comprising: a conveyor belt, and driver wheel and rotational wheel disposed with interval; the driver wheel and the rotational wheel being connected through conveyor belt; a part of the conveyor belt moving towards a first direction being connected to the first positioning pillar and a part of the conveyor belt moving towards a second direction being connected to the second positioning pillar; wherein the driver module driving the first positioning pillar and the second positioning pillar through the conveyor belt to move towards or away from each other so as to calibrate the position of the glass substrate by clamping or releasing the glass substrate during transmission.

According to a preferred embodiment of the present invention, the first mode transmission channel is a roller type transmission channel and the second mode transmission channel is different from the type of the first mode transmission channel.

According to a preferred embodiment of the present invention, the first direction is opposite to the second direction, the first positioning pillar is engaged to the conveyor belt through convex teeth and the second positioning pillar is engaged to the conveyor belt through convex teeth.

According to a preferred embodiment of the present invention, the first positioning pillar is further disposed with a first guiding block, the second positioning pillar is further disposed with a second guiding block, the calibration mechanism further comprises a first guiding pillar, and the first guiding pillar penetrates the first guiding block and the second guiding block so that the first positioning pillar and the second positioning pillar move along the first guiding pillar.

The present invention provides a transmission device for glass substrate, which comprises: a transmission channel and a calibration mechanism; wherein the transmission channel being configured to load and transmit, the calibration mechanism being disposed next to the transmission channel and the calibration mechanism comprising: a first positioning pillar, a second positioning pillar and a driver module; the first positioning pillar being disposed on one side of the transmission channel and the second positioning pillar being disposed on the other side of the transmission channel; the driver module driving the first positioning pillar and the second positioning pillar through the conveyor belt to move towards or away from each other so as to calibrate the position of the glass substrate by clamping or releasing the glass substrate during transmission.

According to a preferred embodiment of the present invention, the driver module comprises: a conveyor belt, and driver wheel and rotational wheel disposed with interval; the driver wheel and the rotational wheel being connected through conveyor belt: a part of the conveyor belt moving towards a first direction being connected to the first positioning pillar and a part of the conveyor belt moving towards a second direction being connected to the second positioning pillar.

According to a preferred embodiment of the present invention, the driver wheel is driven by servo motor.

According to a preferred embodiment of the present invention, the first direction is opposite to the second direction, the first positioning pillar is engaged to the conveyor belt through convex teeth and the second positioning pillar is engaged to the conveyor belt through convex teeth.

According to a preferred embodiment of the present invention, the transmission channel comprises: a first mode transmission channel and a second mode transmission channel, disposed in connected manner and to transmit in order; and the calibration mechanism is disposed at junction between the first mode transmission channel and the second mode transmission channel.

According to a preferred embodiment of the present invention, the driver module comprises: a conveyor belt, and driver wheel and rotational wheel disposed with interval; the driver wheel and the rotational wheel being connected through conveyor belt; a part of the conveyor belt moving towards a first direction being connected to the first positioning pillar and a part of the conveyor belt moving towards a second direction being connected to the second positioning pillar.

According to a preferred embodiment of the present invention, the driver wheel is driven by servo motor.

According to a preferred embodiment of the present invention, the first direction is opposite to the second direction, the first positioning pillar is engaged to the conveyor belt through convex teeth and the second positioning pillar is engaged to the conveyor belt through convex teeth.

According to a preferred embodiment of the present invention, the first mode transmission channel is a roller type transmission channel and the second mode transmission channel is different from the type of the first mode transmission channel.

According to a preferred embodiment of the present invention, the driver module comprises: a conveyor belt, and driver wheel and rotational wheel disposed with interval; the driver wheel and the rotational wheel being connected through conveyor belt; a part of the conveyor belt moving towards a first direction being connected to the first positioning pillar and a part of the conveyor belt moving towards a second direction being connected to the second positioning pillar.

According to a preferred embodiment of the present invention, the driver wheel is driven by servo motor.

According to a preferred embodiment of the present invention, the first direction is opposite to the second direction, the first positioning pillar is engaged to the conveyor belt through convex teeth and the second positioning pillar is engaged to the conveyor belt through convex teeth.

According to a preferred embodiment of the present invention, the first positioning pillar is further disposed with a first guiding block, the second positioning pillar is further disposed with a second guiding block, the calibration mechanism further comprises a first guiding pillar, and the first guiding pillar penetrates the first guiding block and the second guiding block so that the first positioning pillar and the second positioning pillar move along the first guiding pillar.

According to a preferred embodiment of the present invention, the calibration mechanism further comprises a third positioning pillar, a fourth positioning pillar and a second guiding pillar; the third positioning pillar being disposed on one side of the transmission channel and fixedly connected to the first positioning pillar and the third positioning pillar comprising a third guiding block; the fourth positioning pillar being disposed on the other side of the transmission channel and fixedly connected to the second positioning pillar and the fourth positioning pillar comprising a fourth guiding block; the second guiding pillar penetrating the third guiding block and the fourth guiding block so that the third positioning pillar and the fourth positioning pillar moving along the second guiding pillar.

The present invention provides a transmission method for glass substrate, the method using the above transmission device, and the method comprises: using transmission channel to load and transmit glass substrate; during transmission, using driver module to drive the first positioning pillar and the second positioning pillar to calibrate the position of the glass substrate by clamping or releasing the glass substrate.

According to a preferred embodiment of the present invention, the transmission channel comprises a first mode transmission channel and a second mode channel, disposed in connected manner and transmitting in order; the step of using calibration mechanism to dynamically calibrate the position of the glass substrate during transmission specifically comprises: when transmitting to the junction of the first mode transmission channel and the second mode transmission channel, the calibration mechanism is used to dynamically calibrate the position of the glass substrate.

The efficacy of the present invention is that to be distinguished from the state of the art. Through the disposition of calibration mechanism in the transmission device, the present invention can dynamically calibrate the position of the glass substrate on the transmission channel when the glass substrate deviates from the correct position to prevent the glass substrate from cracking caused by deviation during transmission and improve the yield rate of glass substrate manufacturing.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
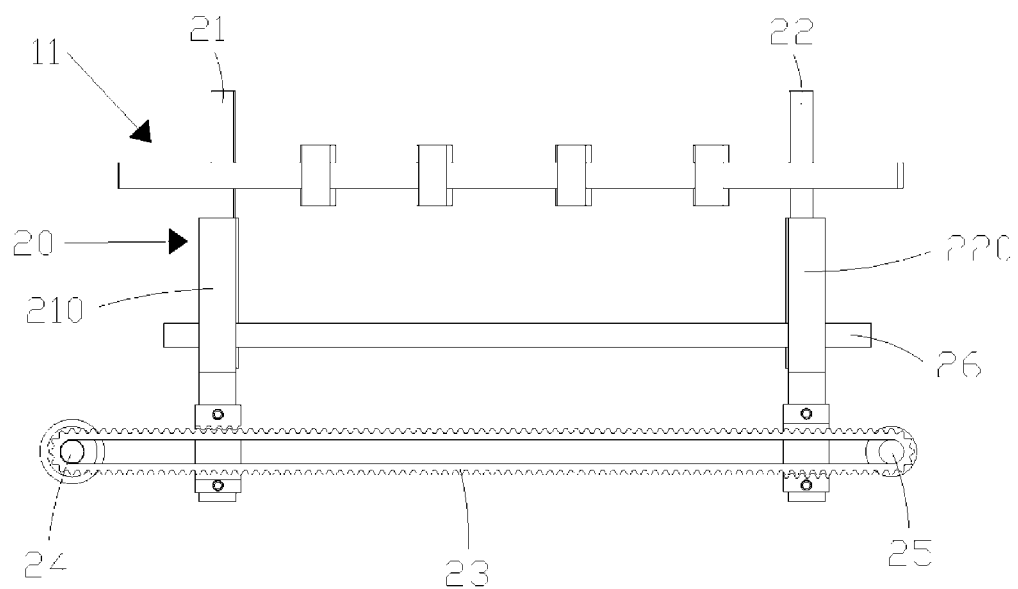
FIG. 1 is a schematic view showing the partial structure of an embodiment of the transmission device according to the present invention.

The following provides a clear and complete description of the technical solution according to the present invention using the drawing and the embodiment. Apparently, the drawings described below show only example embodiments of the present invention, instead of all embodiments. For other embodiments based on the disclosed drawings and embodiments, and obtained by those having ordinary skills in the art without paying any creative effort are also within the scope of the present invention.

Figure 2:
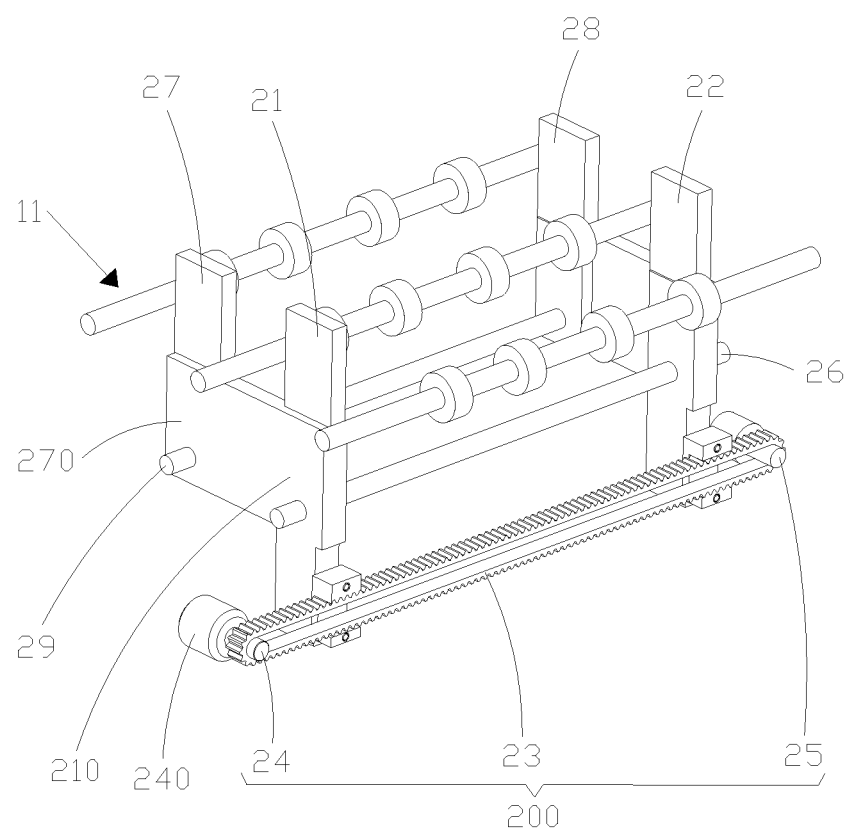
FIG. 2 is a schematic view showing the structure of the transmission device of FIG. 1.
Figure 3:
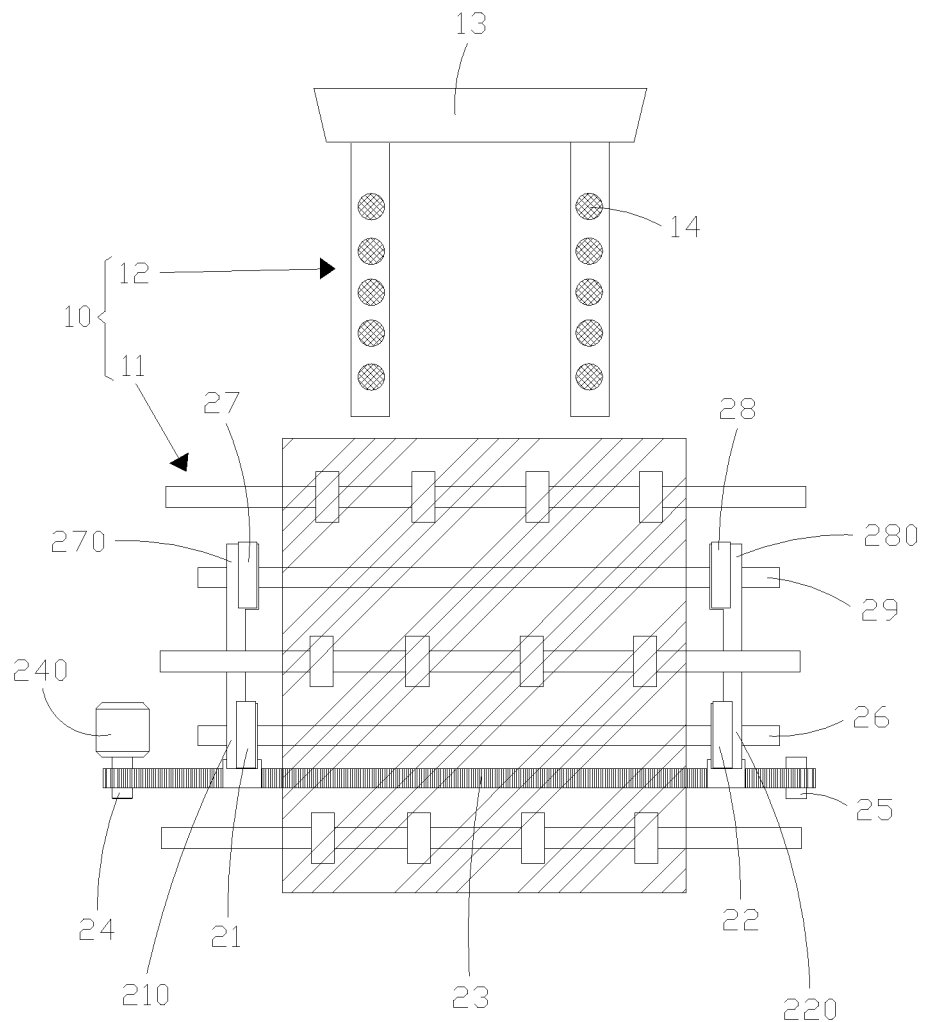
FIG. 3 is a schematic view showing the structure of a specific exemplar of the transmission device of FIG. 1, wherein the transmission channel including a first mode transmission channel and a second mode transmission channel.

Referring to FIGS. 1-3, in the instant embodiment, the transmission device is configured to transmit glass substrate. Specifically, the glass substrate can be a single sheet of glass, or products, such as, color film substrate, active array substrate or liquid crystal box, formed by processing glass. The transmission device comprises, but is not limited to, transmission channel 10 and calibration channel 20. In the instant embodiment, the transmission channel 10 is configured to load and transmit the glass substrate, and the calibration mechanism 20 is disposed next to the transmission channel 10 for dynamically calibrating the position of the glass substrate during transmission.

Because the glass substrate is prone to position deviation during transmission, the calibration mechanism 20 is used to dynamically calibrate the position of the glass substrate during transmission to prevent the glass substrate from cracking caused by position deviation so as to improve yield rate of glass substrate manufacturing. The following describes the specific structure of the transmission device.

The transmission channel 10 comprises, but is not limited to, a first mode transmission channel 11 and a second mode transmission channel 12, disposed in connected manner and to transmit in order. In the instant embodiment, the first mode transmission channel 11 is a roller type transmission channel and the second mode transmission channel 12 is different from the type of the first mode transmission channel 11. Specifically, the second mode transmission channel 12 can be a robot arm 13 with a sucker 14 for moving and transmission. As the robot arm 13 with sucker for moving glass substrate is commonly known to those in this field, the description will not be repeated here.

It should be noted that, in other embodiments, the second mode transmission channel 12 can also be of other types, such as, transmission cart loading and moving glass substrate from the first mode transmission channel 11. The present invention does not impose specific restriction.

It is clear that during switching between different transmission channels 10, when the glass substrate deviates from its position, the glass substrate is possible to crack due to unintentional bumping so as to affect the yield rate of the glass substrate manufacturing. Therefore, in the instant embodiment, the calibration mechanism 20 can be specifically disposed at the junction between the first mode transmission channel 11 and the second mode transmission channel 12 so as to perform calibration of the glass substrate when switching between different modes of transmission channels 10. Of course, the calibration can also be performed at various locations of the transmission channel 10, such as, up, down, left, right, and so on. No specific restriction is imposed here.

In the instant embodiment, the calibration mechanism 20 comprises, but is not limited to, a first positioning pillar 21, a second positioning pillar 22, a driver module 200 and a first guiding pillar 26. The driver module 200 comprises a conveyor belt 23, and driver wheel 24 and rotational wheel 25 disposed with interval. The following describes the specific elements of the calibration mechanism 20.

In the instant embodiment, the first positioning pillar 21 is disposed on one side of the transmission channel 10 and the first positioning pillar 21 is engaged to the conveyor belt 23 through convex teeth. In addition, the first positioning pillar 21 is further disposed with a first guiding block 210.

It should be noted that the first positioning pillar 21 is engaged to the conveyor belt 23 through other means, such as, matching convex and concave parts, as long as the conveyor belt 23 can move the first positioning pillar 21 in a linked manner. Other equivalent linkages are also within the scope of the present invention.

Because the first positioning pillar 21 contacts the glass substrate during calibration, the first positioning pillar 21 should be made of resilient material, such as, rubber, to avoid scratching the glass substrate. Alternatively, a buffer can be disposed between the first positioning pillar 21 of other materials and the contact part of the glass substrate. No specific restriction is imposed here.

The second positioning pillar 22 is disposed on the other side of the transmission channel 10 and is engaged to the conveyor belt 23 through convex teeth. Similarly, the second positioning pillar 22 is further disposed with a second guiding block 220.

It is easy to understand that the second positioning pillar 22 has similar structure, function and features to the first positioning pillar 21. In combination with the earlier description of the first positioning pillar 21, those skilled in this field can easily understand the related features of the second positioning pillar 22. During calibration, the conveyor belt 23 moves the first positioning pillar 21 and the second positioning pillar 22 to contact different sides of the glass substrate so as to push and/or position the glass substrate to default location to realize calibration.

The driver module 200 drives the first positioning pillar 21 and the second positioning pillar 22 to move towards or away from each other so as to calibrate the position of the glass substrate by clamping or releasing the glass substrate during transmission. In the instant embodiment of the driver module 200, the driver wheel 24 and the rotational wheel 25 are connected through conveyor belt 23. The driver wheel is driven by servo motor 240. A part of the conveyor belt 23 moving towards a first direction is connected to the first positioning pillar 21 and a part of the conveyor belt 23 moving towards a second direction is connected to the second positioning pillar 22.

In the instant embodiment, the first direction is opposite to the second direction. In other words, under the movement of the conveyor belt 23, the first positioning pillar 21 and the second positioning pillar 22 move in opposite directions. It should be understood that, during calibration, the first positioning pillar 21 and the second positioning pillar 22 must move in opposite directions to contact the different sides of the glass substrate for performing calibration. After calibration, under the movement of the conveyor belt 23, the first positioning pillar 21 and the second positioning pillar 22 move away from each other to release the glass substrate.

It should be noted that in the instant embodiment, because the first positioning pillar 21 and the second positioning pillar 22 move in opposite directions under the movement of the conveyor belt 23, the calibration mechanism 20 is applicable to different sizes of glass substrate. As such, the same calibration mechanism 20 can be used for all sizes of glass substrates.

It should also be noted that in the instant embodiment, the conveyor belt 23 is a belt and means for the driver wheel 24 and rotational wheel 25 to match the conveyor belt 23 is only one of the realizations of the driver module 200. Other means comprises, such as, oil valve driving, can also be used.

The first guiding pillar 26 can penetrate the first guiding block 210 and the second guiding block 220 so that the first positioning pillar 21 and the second positioning pillar 22 move along the first guiding pillar 26. Preferably, the first guiding pillar 26 should be disposed in parallel with the plane of the glass substrate.

As seen in the collaboration manner of the first guiding block 210, the second guiding block 220 and the first guiding pillar 26, the specific structure and location of the first guiding block 210, the second guiding block 220 and the first guiding pillar 26 can vary depending on the requirements. For example, in other embodiments, the first guiding block 210 can be dispose at the tip of the first positioning pillar 21, and the second guiding block 220 can be dispose at the tip of the second positioning pillar 22, Similarly, the cross-section of the first guiding pillar 26 can be round, square or other shape as long as the shape matches the holes on the first guiding block 210 and the second guiding block 220.

The above describes the main structure of the calibration mechanism. For better calibration function, the calibration mechanism 20 can comprise a third positioning pillar 27, a fourth positioning pillar 28 and a second guiding pillar 29. The third positioning pillar 27 is disposed on one side of the transmission channel 10 and fixedly connected to the first positioning pillar 21 and the third positioning pillar 27 comprises a third guiding block 270. The fourth positioning pillar 28 is disposed on the other side of the transmission channel 10 and fixedly connected to the second positioning pillar 22, and the fourth positioning pillar 28 comprises a fourth guiding block 280. The second guiding pillar 29 penetrates the third guiding block 270 and the fourth guiding block 280 so that the third positioning pillar 27 and the fourth positioning pillar 28 move along the second guiding pillar 29.

It should be easy to understand that the structure and function of the third positioning pillar 27, the fourth positioning pillar 28 and the second guiding pillar 29 are similar to those of first positioning pillar 21, the second positioning pillar 22 and the first guiding pillar 26. In reference of the earlier description, those skilled in this field can easily understand the features of the third positioning pillar 27, the fourth positioning pillar 28 and the second guiding pillar 29, and thus the detailed description is omitted here.

It should be noted that in the instant embodiment, the third positioning pillar 27 is fixedly connected to the first positioning pillar 21 and the fourth positioning pillar 28 is fixedly connected to the second positioning pillar 22. However, it is easy to understand that through fixed connection, the third positioning pillar and the first positioning pillar 21, and the fourth positioning pillar 28 and the second positioning pillar 22 can be ensured to move synchronously to perform calibration synchronously on the glass substrate. In addition, this manner can also reduce the use of driver module 200 to save cost.

As such, the present invention can also comprise a fifth positioning pillar, a sixth positioning pillar and a third guiding pillar; or alternatively, a plurality of first positioning pillars 2, a plurality of second positioning pillars 22 and a plurality of guiding pillars 26. These variations are all within the scope of the present invention.

It should also be noted that other embodiments can use other calibration mechanisms, such as, using suction disc to move the glass substrate to default location of the transmission channel and then transmit. No specific restriction is imposed here.

In the instant embodiment, through the disposition of calibration mechanism 20 in the transmission device, the present invention can dynamically calibrate the position of the glass substrate on the transmission channel when the glass substrate deviates from the correct position to prevent the glass substrate from cracking caused by deviation during transmission and improve the yield rate of glass substrate manufacturing.

Figure 4:
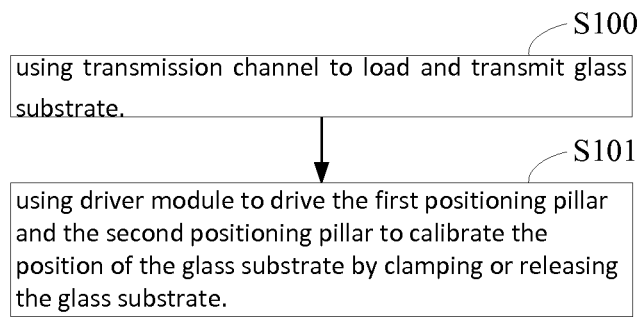
FIG. 4 is a flowchart of an embodiment of the transmission method according to the present invention.

Referring to FIG. 4, the instant embodiment of the transmission method uses the above transmission device. The method comprises, but is not limited to, the following steps.

S100: using transmission channel to load and transmit glass substrate.

S101: using driver module to drive the first positioning pillar and the second positioning pillar to calibrate the position of the glass substrate by clamping or releasing the glass substrate.

In should be noted that in other embodiments, the transmission channel can further comprises the first transmission channel and the second transmission channel, disposed in linked manner and transmitting in order. Correspondingly, step S101 specifically comprises: when transmitting to the junction of the first mode transmission channel and the second mode transmission channel, the calibration mechanism is used to dynamically calibrate the position of the glass substrate.

It is clear that the transmission method can vary the location of the calibration mechanism to perform the calibration on the glass substrate. The junction is only a preferred embodiment of the present invention, instead of the only embodiment.

It should be noted that, regardless of the previous embodiment of the transmission device or the present instant of the transmission method, the actual application is not limited to transmitting and calibrating the glass substrate. The present invention is also applicable to transmitting and calibrating other flat sheet of materials during manufacturing process.

As such, the present invention can dynamically calibrate the position of the glass substrate on the transmission channel when the glass substrate deviates from the correct position to prevent the glass substrate from cracking caused by deviation during transmission and improve the yield rate of glass substrate manufacturing.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

What is claimed is:

1. A transmission device for glass substrate, which comprises:
    a transmission channel, the transmission channel being configured to load and transmit, the transmission channel comprising: a first mode transmission channel and a second mode transmission channel, disposed in a connected manner and to transmit in order; and
    a calibration mechanism, the calibration mechanism being disposed at a junction between the first mode transmission channel and the second mode transmission channel, the calibration mechanism comprising:
    a first positioning pillar, the first positioning pillar being disposed on one side of the transmission channel;
    a second positioning pillar, the second positioning pillar being disposed on the other side of the transmission channel; and
    a driver module, the driver module comprising: a conveyor belt, and a driver wheel and a rotational wheel spaced from each other; the driver wheel and the rotational wheel being connected through the conveyor belt; a part of the conveyor belt moving towards a first direction being connected to the first positioning pillar and a part of the conveyor belt moving towards a second direction being connected to the second positioning pillar;
    wherein the driver module driving the first positioning pillar and the second positioning pillar through the conveyor belt to move towards or away from each other so as to calibrate the position of the glass substrate by clamping or releasing the glass substrate during transmission; and
    wherein the first positioning pillar is further disposed with a first guiding block, the second positioning pillar is further disposed with a second guiding block, the calibration mechanism further comprises a first guiding pillar, and the first guiding pillar penetrates the first guiding block and the second guiding block so that the first positioning pillar and the second positioning pillar move along the first guiding pillar.

2. The transmission device as claimed in claim 1, characterized in that the first mode transmission channel is a roller type transmission channel and the second mode transmission channel is different from the type of the first mode transmission channel.

3. The transmission device as claimed in claim 1, characterized in that the first direction is opposite to the second direction, the first positioning pillar is engaged to the conveyor belt through convex teeth and the second positioning pillar is engaged to the conveyor belt through convex teeth.

4. A transmission method for glass substrate, the method using the transmission device as claimed in claim 1, the method comprises:
    using transmission channel to load and transmit a glass substrate; and
    during transmission, using a driver module to drive the first positioning pillar and the second positioning pillar to calibrate the position of the glass substrate by clamping or releasing the glass substrate.

5. The transmission method as claimed in claim 4, characterized in that the transmission channel comprises a first mode transmission channel and a second mode channel, disposed in a connected manner and transmitting in order; the step of using a calibration mechanism to dynamically calibrate the position of the glass substrate during transmission specifically comprises: when transmitting to the junction of the first mode transmission channel and the second mode transmission channel, the calibration mechanism is used to dynamically calibrate the position of the glass substrate.

6. A transmission device for a glass substrate, which comprises:
   a transmission channel, the transmission channel being configured to load and transmit; and
   a calibration mechanism, the calibration mechanism being disposed next to the transmission channel, the calibration mechanism comprising:
   a first positioning pillar, the first positioning pillar being disposed on one side of the transmission channel;
   a second positioning pillar, the second positioning pillar being disposed on the other side of the transmission channel;
   a driver module, being configured to drive the first positioning pillar and the second positioning pillar through a conveyor belt to move towards or away from each other so as to calibrate the position of the glass substrate by clamping or releasing the glass substrate during transmission; and
   wherein the first positioning pillar is further disposed with a first guiding block, the second positioning pillar is further disposed with a second guiding block, the calibration mechanism further comprises a first guiding pillar, and the first guiding pillar penetrates the first guiding block and the second guiding block so that the first positioning pillar and the second positioning pillar move along the first guiding pillar.

7. The transmission device as claimed in claim 6, characterized in that the driver module comprises: a conveyor belt, and a driver wheel and a rotational wheel spaced from each other; the driver wheel and the rotational wheel being connected through the conveyor belt; a part of the conveyor belt moving towards a first direction being connected to the first positioning pillar and a part of the conveyor belt moving towards a second direction being connected to the second positioning pillar.

8. The transmission device as claimed in claim 7, characterized in that the driver wheel is driven by a servo motor.

9. The transmission device as claimed in claim 7, characterized in that the first direction is opposite to the second direction, the first positioning pillar is engaged to the conveyor belt through convex teeth and the second positioning pillar is engaged to the conveyor belt through convex teeth.

10. The transmission device as claimed in claim 6, characterized in that the transmission channel comprises: a first mode transmission channel and a second mode transmission channel, disposed in a connected manner and to transmit in order; and the calibration mechanism is disposed at a junction between the first mode transmission channel and the second mode transmission channel.

11. The transmission device as claimed in claim 10, characterized in that the driver module comprises: the conveyor belt, and a driver wheel and a rotational wheel spaced from each other; the driver wheel and the rotational wheel being connected through the conveyor belt; a part of the conveyor belt moving towards a first direction being connected to the first positioning pillar and a part of the conveyor belt moving towards a second direction being connected to the second positioning pillar.

12. The transmission device as claimed in claim 11, characterized in that the driver wheel is driven by a servo motor.

13. The transmission device as claimed in claim 11, characterized in that the first direction is opposite to the second direction, the first positioning pillar is engaged to the conveyor belt through convex teeth and the second positioning pillar is engaged to the conveyor belt through convex teeth.

14. The transmission device as claimed in claim 10, characterized in that the first mode transmission channel is a roller type transmission channel and the second mode transmission channel is different from the type of the first mode transmission channel.

15. The transmission device as claimed in claim 14, characterized in that the driver module comprises: the conveyor belt, and a driver wheel and a rotational wheel spaced from each other; the driver wheel and the rotational wheel being connected through the conveyor belt: a part of the conveyor belt moving towards a first direction being connected to the first positioning pillar and a part of the conveyor belt moving towards a second direction being connected to the second positioning pillar.

16. The transmission device as claimed in claim 15, characterized in that the driver wheel is driven by a servo motor.

17. The transmission device as claimed in claim 15, characterized in that the first direction is opposite to the second direction, the first positioning pillar is engaged to the conveyor belt through convex teeth and the second positioning pillar is engaged to the conveyor belt through convex teeth.

18. The transmission device as claimed in claim 6, characterized in that the calibration mechanism further comprises a third positioning pillar, a fourth positioning pillar and a second guiding pillar; the third positioning pillar being disposed on one side of the transmission channel and fixedly connected to the first positioning pillar and the third positioning pillar comprising a third guiding block; the fourth positioning pillar being disposed on the other side of the transmission channel and fixedly connected to the second positioning pillar and the fourth positioning pillar comprising a fourth guiding block; the second guiding pillar penetrating the third guiding block and the fourth guiding block so that the third positioning pillar and the fourth positioning pillar moving along the second guiding pillar.

* * * * *